Figure 1:
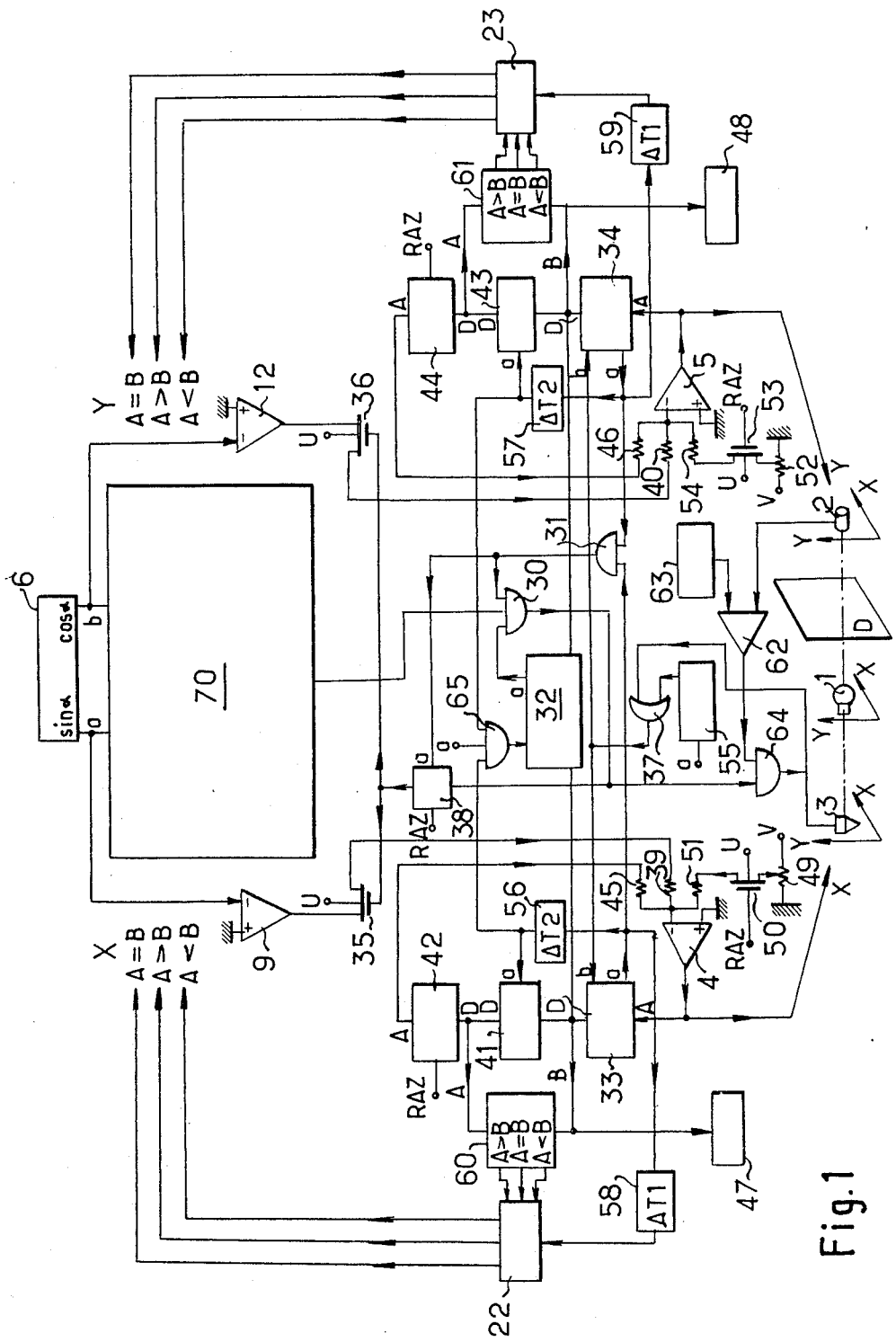

United States Patent [19]
Daguillon

[11] 3,920,316
[45] Nov. 18, 1975

[54] ELECTRONIC CONTOUR FOLLOWER

[75] Inventor: Claude Daguillon, Chatillon-sous-Bagneux, France

[73] Assignee: Compagnie de Signaux et d'Entreprises Electriques, Chatillon-sous-Bagneux, France

[22] Filed: Jan. 3, 1974

[21] Appl. No.: 430,546

[30] Foreign Application Priority Data
Jan. 8, 1973 France .......................... 73.00459
Oct. 23, 1973 France .......................... 73.37817

[52] U.S. Cl................................... 250/202; 318/577
[51] Int. Cl.²............................................ G05B 1/00
[58] Field of Search ......... 250/202, 203; 340/172.5; 235/198; 318/162, 566, 567, 577; 178/6.8

[56] References Cited
UNITED STATES PATENTS
2,986,643 5/1961 Brouilette .......................... 250/202
3,529,084 9/1970 Rich .................................. 250/202
3,610,935 10/1971 VonVoros .......................... 318/577

Primary Examiner—James W. Lawrence
Assistant Examiner—D. C. Nelms
Attorney, Agent, or Firm—William Anthony Drucker

[57] ABSTRACT

A contour follower is provided, wherein a line or contour to be followed is scanned with a circular scan by a reading head to produce a coincidence pulse each time the scan reaches the line. The circular scan is obtained by means of two coordinate drive systems controlled by drive signals derived from two sinewave signals which are 90° out of phase with one another. At each coincidence pulse, the scanning is stopped and the drive signals are stored and added to the previous signals which correspond to the origin of the scan with a view to obtain a motion of the circular scan along the line. Means are provided for comparing the coordinates of any two successive coincidence points in order to determine the slope of the contour and to start the application of the drive signals at one of four moments when their amplitude passes through a zero value. Each circular scan is thus started either in the first, the second, or third of the fourth quadrant, depending upon the slope of the line. Gating means are provided for avoiding that a circular scan may start before the information derived from the preceding scan has been processed.

8 Claims, 4 Drawing Figures

ELECTRONIC CONTOUR FOLLOWER

Curve following devices are known in which use is made, to follow the curve, of a circle of small diameter, the signals supplied by the intersection of this circle and of the curve being used to control the movement of the circle.

French Pat. No. 1,185,152, applied for on 24th Oct. 1957 by Compagnie Francaise Thomson-Houston, describes a device of this type, in which means are provided for the exact centring of the scanning circle on the curve during the analysis.

French Pat. No. 1,312,704 applied for on 11th Jan. 1962 by Compagnie Francaise Thomson-Houston describes a device of this type, intended to permit a faster analysis, in which means are provided so that the scanning circle moves by an amount approximately equal to its radius at each revolution of a scanning pencil of light which generates the said circle.

A first object of the invention is a device of a general type referred to hereinabove, but which is distinguished particularly from that which is the subject of the two patents mentioned above in that the two sine-shaped voltages dephased by 90° which generate each of the successive scanning circles are of the single-period type.

At the moment when the analysed magnitude reaches a value defined by the curve to be followed, a circle is therefore partially described about the point of the scanned plan corresponding to said value until a new point corresponding to the said value is met. At that moment, a new circle is released and is itself partially described about a new point taken as the centre. The scanning circles are therefore released one by one, in discontinuous manner, a short period being provided between two successive circles, while in previous solutions, scanning was a continuous phenomenon, utilising, according to the first patent above-mentioned, a luminous spot travelling for a great number of times a scanning circle which itself was permanently moving and, according to the second patent above-mentioned, a scanning circle travelled over once only, but in complete manner and permanently, without any interruption of the scanning.

An important advantage of the invention is that, at each point analysed, it is possible to take the corresponding data in store and to exploit such data, the order to release the following circle being given only when this or even this exploitation has been done. No intermediate store is necessary for the purpose as the case would be in the previous solutions where a sampling method is followed.

According to another feature of the invention, the storage members which permit, in per se known manner, the recording at each point of the coordinates of the scanning circle to add them to the previously recorded coordinates and thus move the said circle, include an analogue-digital converter. As a result the data can be stored as a numerical value, for example on punched or printing tape. Higher accuracy of measurement is obtained and, also, the possibility of operation at frequencies lower than those which previous systems authorised. Finally, the invention makes it possible to use both tracer tables, indispensable for the analysis of large area documents, and flying spot tubes permitting an ultrarapid analysis of small documents.

The invention has furthermore for its object a preferred embodiment which makes it possible, whatever the shape of the curve to be analysed, to ensure the unidirectional progression of the analysis.

According to this embodiment, a generator supplies on a permanent basis two sine-shaped voltages which are 90° out of phase with one another, and means are provided to compare the coordinates of the two points of the pairs of points successively scanned and to release the transmission of the said sine-shaped signals to the adding elements at one of the four moments of their passing through zero, selected as a function of the result of the said comparison of coordinates.

The invention will be better understood from the following description.

Figure 2:
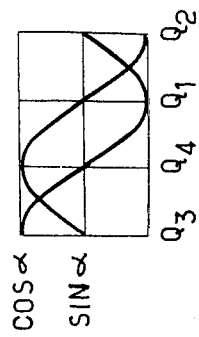
Figure 3:
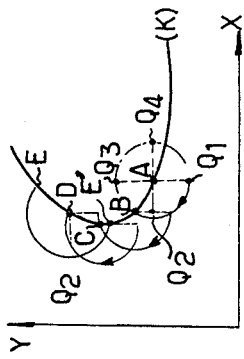
Figure 4:
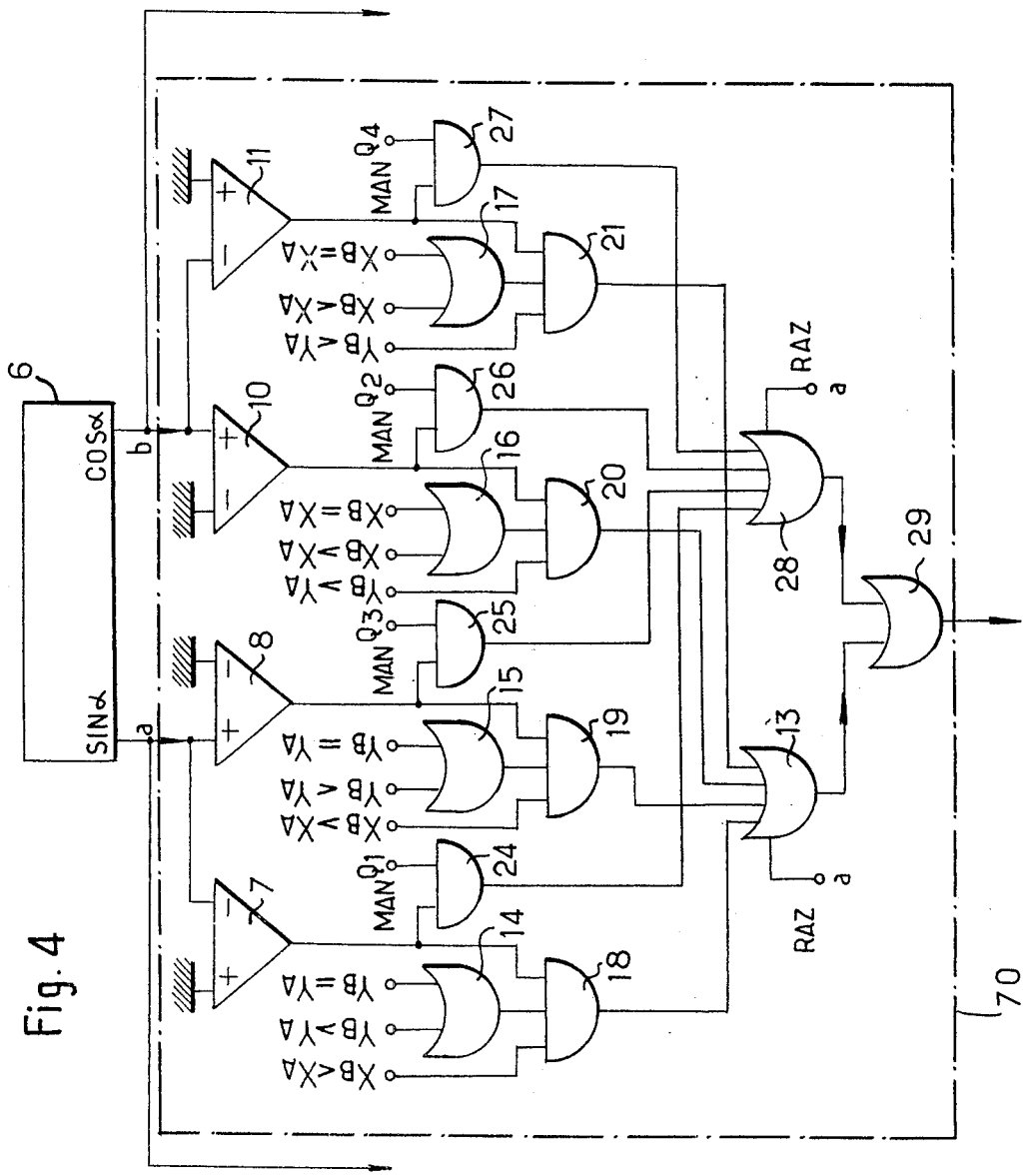

In the attached drawing:

FIGS. 1 and 4, taken in conjunction, show the fundamental diagram of a curve following device in accordance with a preferred embodiment of the invention;

FIG. 2 represents the two sine-shaped voltages and their four passages through zero, and FIG. 3 represents several successive scanning circles on the curve to be followed.

The device represented in FIGS. 1 and 4, FIG. 4 showing more the detail of the circuits contained in block 70, FIG. 1, is intended for the analysis of a fixed document D, for example by means of a light source 1 or mobile analysis element along plane XY, and a photo-electric detector 2 any displacement of which is bound with that of the source. This displacement, as well as that of the marking source 3 which, for example, forms part of a tracer table, is controlled by the voltages X and Y taken at the respective outputs of the summation amplifiers 4 and 5.

The voltages X and Y are generated in the following manner: a generator 6 supplies on a permanent basis, at its respective outputs 6a and 6b, two sine-shaped voltages which are 90° out of phase with respect to each other, i.e. $\sin\alpha$ and $\cos\alpha$. The output 6a is connected to the (−) input of a monostable comparator 7 (FIG. 4) which detects the passing through zero of $\sin\alpha$ towards the negative values (point Q1 of the $\sin\alpha$ curve of FIG. 2), as well as to the (+) input of a monostable comparator 8 (FIG. 4) which detects the passing through zero of $\sin\alpha$ towards the positive values (point Q3). The output 6a is further connected to the inverter input of a reversing amplifier 9.

The output 6b is connected to the input (+) of a monostable comparator 10 (FIG. 4) which detects the passing through zero of $\cos\alpha$ towards the positive values (point Q2), and to the (−) input of a monostable comparator 11 (FIG. 4) which detects the passage through zero of $\cos\alpha$ towards the negative values (point Q4). The output 6b is further connected to the reversing input of a reversing amplifier 12.

The outputs of the comparators 7, 8, 10, 11 are connected to an OR gate 13 through OR gates 14 to 17 and AND gates 18 to 21. These gates are validated in the following manner: two members 22 and 23 retain in store, in a manner which will be detailed hereinunder, data relating to the slope of the curve analysed. If A is the analysis point which has just been marked, of coordinates $X_A$ and $Y_A$, and B the following point, of coordinates $X_B$ and $Y_B$, the four following cases will be distinguished:

1st case $X_B > X_A$ and $Y_B \leq Y_A$
2nd case $Y_B > Y_A$ and $X_B \leq X_A$
3rd case $X_B > X_A$ and $Y_B \leq Y_A$ 4th case $Y_B > Y_A$ and $X_B \geq X_A$ It is easy to show that the analysis will progress in unidirectional manner, without going back, this being the case whatever the shape of the curve to be analysed, if the scanning of the document is effected by means of successive circles, each centred on the preceding analysis point, and always scanned in the same direction, from a release point coinciding with Q3 in the first case, Q4 in the second case, Q1 in the third case and Q2 in the fourth case, points Q1 to Q4 being those which are indicated in FIG. 3, in which a representation has been given of a complete scanning circle, centred at A on the curve X to be analysed.

It will be seen that the portion of this circle which is actually gone through from Q1 intersects curve X and B, a point where the scanning of the circle stops. As $X_A > X_B$ and $Y_A < Y_B$, the following circle, centred at B is still scanned from its position Q1, as far as C. As $Y_B < Y_C$ and $X_B > X_C$, the following circle, centred on C, is still scanned from its position Q1, as far as D. If, about D taken as a centre, a circular scanning is restarted from a position Q1, it will be seen that the point E' analysed would correspond to a return back of the analysis. Indeed, as $Y_C < Y_D$ and $X_C < X_D$, the circle centred on D will be scanned from its position Q2 as far as a point E which does correspond to an unidirectional progression of the analysis.

The above reasoning applies when $\sin\alpha$ is applied for the control at X, $\cos\alpha$ for the control at Y and when the curve is scanned clockwise. If, on the other hand, $\sin\alpha$ were applied for the control at Y and $\cos\alpha$ for the control at X, the curve being then scanned anticlockwise, the first case would correspond to point Q4, the second to point Q3, the third to point Q2 and the fourth to point Q1.

It is clear that, if the analysis circle is to start at Q1, it will be necessary for the $\sin\alpha$ voltage to be applied to the device for control at X of the analysis element as it passes through zero towards the negative values, which does correspond to the point marked Q1 on FIG. 2. There will be established in the same manner the concordance between the points marked Q2, Q3 and Q4 in FIGS. 2 and 3 respectively.

Elements 22 and 23 each have an output which supplies the datum A = B, an output which supplies the datum A > B and an output which supplies the datum A < B. These outputs are connected to the gates as indicated in FIG. 4.

It will be seen, for example, that for $X_B > X_A$ and $Y_B \leq Y_A$, the gate 19 will be unlocked at the time when $\sin\alpha$ will pass through zero towards the positive values, that is to say in the first case above. Similarly, the gate 18 will be unlocked in the third case, 21 in the second case and 20 in the fourth case.

The outputs of the comparators 7, 8, 10, 11 are moveover connected to respective AND gates 24 to 27, having their outputs connected to an OR gate 28 (FIG. 4). The gate 24 can receive manually, before the start of the analysis, a signal "Q₁MAN" for validation. When this is the case, when $\sin\alpha$ passes through zero towards the negative values, a signal is transmitted to the output of gate 28. Similarly, a signal "Q₃MAN," applied to the gate 25, makes it possible to select Q3 manually at the start of the analysis: a signal "Q₂MAN" applied to the gate 26 permits the manual selection of Q2 at the start of the analysis and a signal "Q₄MAN" applied at the gate 27 permits the manual selection of Q4 at the commencement of the analysis.

Gates 13 and 28 are connected with an OR gate 29 (FIG. 4) the output of which is connected with an input of an AND gate 30 (FIG. 4).

Gate 30 is connected on the one hand with the output of an AND gate 31, and on the other hand with the output 32a of an external exploitation system of the coordinates X and Y of the point analysed (such as tape puncher, or magnetic recorder). Output 32a is validated when the exploitation has ended, Gate 31 is connected with the output 33a of an analogue-digital converter 33 which forms part of an element for storing the control voltages at X. As will be seen hereinunder, an end of conversion pulse is produced on the output 33a when the device 33 has completed its analogue-digital conversion; similarly, an analogue-digital converter 34 which forms part of an element for storing the control voltages at Y, sends, on its output 34a connected to the gate 31, an end of conversion pulse. The simultaneous presence of these two pulses validates the input of the gate 30 connected with gate 31.

When gate 30 is validated, it controls the closing of two electronic switches 35–36 through a bistable circuit 38. The outcome is that the sine-shaped output signals of the amplifiers 9 and 12 can then be transmitted, through resistors 39 and 40 respectively, to the amplifiers 4 and 5.

The output of the amplifier 4 is connected to the analogue input 33A of the converter 33, the digital output 33D of which is itself connected through a memory 41 to the digital input 42D of an analogue-digital converter 42. Elements 33 – 41 – 42 constitute the memory of the control voltages at X mentioned hereinabove.

Similarly, the output of the amplifier 5 is connected with the analogue input 34A of the converter 34, the digital output 34D of which is itself connected, through a memory 43, with the digital input 44D of an analogue converter 44. Elements 34-43-44 constitute the memory of the control voltages at Y, mentioned above.

The output 42A is connected with an input of the amplifier 4 through a resistor 45, while output 44A is connected to an input of the amplifier 5 through a resistor 46.

An element 47 permanently displays the numerical value at output 33D, while an element 48 permanently displays the numerical value at the output 34D.

The displacement at X may be controlled manually by means of a potentiometer 49 to which a continuous voltage V is applied, through an electronic switch 50, and by means of a resistor 51 connected, as resistors 45 and 39, to the (−) inverter input of the amplifier 4.

Similarly, the displacement at Y may be controlled manually by means of a potentiometer 52 to which a continuous voltage V is applied, through an electronic switch 53, and by means of a resistor 54 connected, as resistors 46 and 40, to the (−) inverter input of amplifier 5.

A clock 55 sends, through gate 37, pulses to the respective inputs 33b and 34b; these pulses control the conversion operations before the analysis proper, as will be seen hereinunder.

Delay elements 56 and 57 connect the respective outputs 33a and 34a to the respective control inputs 41a and 43a. As a result, the information present at 33D or 34D is transferred to the output of the memory 41 or 43 at the end of a period $\Delta T_2$. Similarly, the end of conversion signal is applied to the respective elements 22 and 23 at the end of a delay $\Delta I_1 < \Delta I_2$, supplied by the delay elements 58 and 59 respectively.

The outputs 33D and 41D are connected with a digital comparator 60 which supplies the data XA > XB, XA = XB or XA < XB to the element 22. Similarly, the outputs 34D and 43D are connected with a digital comparator 61, which supplies the data $Y_A < Y_B$, $Y_A = Y_B$ or $Y_A > Y_B$ to the element 23.

A differential amplifier 62 compares a value or a range of reference values of the magnitude analysed, supplied by an element 63, to the instantaneous value supplied by the detector 2 and, at each coincidence, applies a logical validation level to an input of an AND gate 64, the other input of which is connected to the output of the gate 30. The output of gate 64 controls the marking element 3 as well as an input of gate 37.

The operation of the device which has just been described is, in its principle, as follows:- single sinewave signals which are 90° out of phase are, at the time of the coincidences referred to hereinabove, applied at X and at Y through the respective summation amplifiers 4 and 5. Each of these amplifiers, for example 4, carries out the summation of the corresponding sinewave signal (applied at 39) and of the output signal of the memory, such as 33–41–42 (applied at 45). The final outcome is that the elements 1 and 3 describe, at each coincidence, a circle centred on the curve to be analysed (FIG. 3).

In the preferred embodiment described, this circle is made to start at a position Q1, Q2, Q3 or Q4, according to the slope of the curve, such as defined, in the four cases set out above, by the coordinates of two points A and B scanned in succession.

More precisely, before the analysis proper, zero-resetting signals of appropriate signlas are applied to the different points marked RAZ on the drawing. Clock 55 then sends conversion control pulses, so that the converters 33 and 34 give rise to the display, at 47 and 48, of the numerical values which define the initial position of the analysis element. By acting on the potentiometers 49 and 52 (the switches 50 and 53 being closed by the zero-resetting signals), the manual regulation is then effected of this initial position at X and Y. During this manual adjustment, the element 38, controlled by the zero-resetting pulses, opens the switches 35 and 36, so that the circular scanning does not take place.

To release the analysis, the zero-resetting signals are replaced by starting signals applied at the same points (except at 13a and 28a). Moreover, signals applied at 55a stop the clock 55 when the last conversion in progress has ended, that is to say when the end of conversion pulse, already mentioned, is produced at 33a and 34a. At this moment, the initial position of the analysis members is indicated at 33D-34D, then after the delay $\Delta T_2$, transferred to the output of the memories 41 and 43.

As long as the signals RAZ are applied to the gates 13 (at 13a) and 28 (at 28a), only gate 28 is a passing gate (the signal RAZ applied at 28 being alone of suitable polarity). The gate 28 transmits the manual selection information of positions Q1 to Q4. If, for example, a manual signal is applied at Q₂MAN at gate 26, when cosα passes through zero towards a positive value, gates 26–28 and 29 are validated. Gate 30 will itself be validated when gate 31 will have been validated by the end of conversion signals and when exploitation by element 32 has ended. This is the case when, the starting signal having been applied at 65a to the gate 65 and period $\Delta T_2$ having elapsed, the initial position will have been processed by the element 32. At this moment, gate 30 is a passing gate and transmits a signal on 38b which controls the closing of the switches 35 and 36. The effect of this is to apply to the outputs X and Y the analysis signals having as their origin the manually selected starting position.

Gate 64 closes when, a portion of the first scanning circle having been described, there will be a coincidence datum originating from the comparator 62.

The element 3 is then controlled and the conversion by means of the converters 33 and 34 is itself controlled at 33b and 34b, through gate 37.

The first coincidence datum at the output of gate 64 is moreover processed, by an element not illustrated, to permit the opening of the gate 28 by its input a and, at the same time, the closure of the gate 13 by its input a. From that moment, the values stored in 22 and 23 control the selection of each position of inception of analysis through gate 13.

The conversion control applied at 33b and 34b, as was indicated hereinabove, makes it possible to memorise the coordinates of the point of first coincidence.

As long as the transfer of these coordinates at 41D and 43D has not taken place (that is to say during the period $\Delta T_2$ counted from the end of conversion pulse), it is the coordinates of the initial point which are applied at A to the comparators 60 and 61. At the same time, the coordinates of the point of coincidence are applied at B, so that comparison can take place. At the end of the period $\Delta T_1$, counted from the end of conversion pulse, the latter authorises the storage of the results of the comparison at 22 and 23. These results will come to carry out the selection of the positions Q1 to Q4, as was explained hereinabove, which will make it possible to determine the position of a new scanning circle.

The effect of the end of conversion pulse is, through the medium of gate 31, to validate again the corresponding input of gate 30 to authorise the subsequent release of the new circle. Moreover, through the element 38, it opens the switches 35 and 36, and therefore stops the scanning of the first circle. The stop position of the first circle is not quite the point of coincidence, as scanning continues during the short duration of the conversion. At the end of the period $\Delta T_2$, the AND gate 65 is unlocked by the delayed end of conversion pulses, the starting signals being moreover applied on its input 65a. This AND gate validates the exploitation element 32 which receives the informations present at 33D and 34D. When exploitation has ended, the gate 32a validates the gate 30. In other words, a new circle is not released if the exploitation of the coordinates of the preceding point has not ended.

If, on the other hand, the exploitation of the coordinates of the first point of coincidence has ended, the new circle is released. It is scanned until the second coincidence, and the continuation of the process already described is reproduced.

The applications of the device described may be varied, an example being constituted by the tracing of isodensity curves.

In this particular application, source 1 may be constituted by a tube of the flying spot type the beam of which is received by a photo-multiplier performing the role of the detector 2. It should be stressed that the photomultiplier will receive permanently light intensities comprised within a relatively narrow range of values and, as a result, recovery time will have no effect in practice. It will therefore follow variations of intensity without difficulty, even if the scanning speed is high. It is therefore possible to make the optimum advantage of the high operating speeds of the existing storage devices, the frequency of the generator 6 being suitably selected for the purpose.

The amplitude of the sinewave generated will be selected as a function of the response sensitivity of the storage device and of the inertia of the analysis device. The adjustment of the phase shift between terminals 6a and 6b would make it possible, for example, to scan, no longer according to circles, but according to elongated ellipses having their great axis perpendicular to the isodensity curves, with a view to improving the definition.

It will be observed that the optical density to be analysed could exhibit discontinuities, without the marking ceasing to be effective, provided the size of such discontinuities remains below the corresponding dimension of the scanning ellipse.

Generally speaking, the device applies to the bidimensional analysis and to the display or storage of any physical magnitude, materially detectable in a plane XOY. This physical magnitude may manifest itself in the form of a radiation (case of the analysis of a luminescent surface, for example) in which case the role of the generator 1 will be cut out, the detector 2 which receives this radiation then having to be subjected to a displacement control at X and Y.

The physical magnitude may also be constituted by a transmission, absorption or reflection characteristic of a wave of any nature, for example light or sound, in which case it will obviously be necessary to provide a generator 1 and a detector 2, one of which of these two components of the analysis member being subjected to the displacements control.

The display device may itself be made in very differing manners according to applications (tracer table, cathode ray tube, or others) and even comprise elements shared with the analysis device (a tracing table the stylus of which is controlled along X and at Y coordinates, may, for example, be provided with an analysis element solid with the stylus). In the event where the analysis and display devices have separate displacement controls, any scale factor may be adopted between the scanning and the display.

It is not even necessary that the datum analysed be translated by a display in a plan scanned along two axes of coordinates in synchronism with the analysis.

It is indeed possible to read, at every time the detector supplies a pulse, the corresponding coordinates of the analysis element and to be satisfied with storing the numerical values of these coordinates, for example on punched or printer tape.

It should be stressed that the device described makes such a storage very easy as the instantaneous numerical values of the two scanning control voltages are permanently available between two successive pulses of the detector.

Finally, although the control of the displacement of the analysis element is preferably carried out by subjecting it to two movement components respectively parallel with two axes of Cartesian coordinates, it would be possible to consider, without departing from the scope of the invention, using other means of controlling the scanning by successive ellipses or circles and any other system of coordinates making it possible to define, with a view to storing it, the position of the points detected.

I claim:
1. A contour follower for analyzing data supported on a bidimensional source of data, said contour follower comprising a reading head adapted to produce a coincidence output pulse each time the data read by the reading head lies within a predetermined range of values, actuator means coupled to the reading head for displacing the reading head relative to the source of data along two axes of coordinates, recorder means for recording the coordinates of the reading head for each of said coincidence pulses, said recorder means providing a status signal when ready to record new data after having recorded the coordinates of the reading head at each coincidence pulse, generator means having first and second outputs and adapted for providing on said outputs first and second sinewave signals having predetermined phase-shift one relative to the other, first and second summing circuits each having first and second inputs and an output; first and second switching means respectively connecting the first and second outputs of the generator means to the respective first inputs of the first and second summing circuits, first and second storage means each having an input and an output, the respective inputs of the first and second storage means being connected to the respective outputs of the first and second summing circuits and the respective outputs of the first and second storage means being connected to the respective second inputs of the first and second summing circuits, the outputs of the summing circuits being connected to the actuator means, gating means connected to the storage means and to the reading head for controlling the storage of the respective sinewave signals into the storage means at each coincidence pulse, and control means adapted for closing said first and second switching means at each occurrence of a status signal and for opening said switching means after the sinewave signals have been stored into storage means.

2. A contour follower according to claim 1, further comprising first and second comparator means for comparing the respective coordinates of the reading head which correspond to the successive coincidence pulses and further gating means controlled by the comparator means for enabling the control means to effect the closure of the switching means at one of the four times when the amplitude of each of the sinewave signals reaches a zero value.

3. A contour follower according to claim 2, wherein each of the said first and second comparator means and three outputs respectively validated when the coordinate $X_A$, respectively $Y_A$, of the reading head which corresponds to a coincidence pulse is respectively equal, greater or smaller than the coordinate $X_B$, respectively $Y_B$ of the reading head which corresponds to the immediately succeeding coincidence pulse, the said outputs being connected to the said further gating means, the said further gating means having an output which is validated at one of the said four times, depending upon which of the following pairs of inequalities: $X_B > X_A$ and $Y_B \leq Y_A$; $Y_B < Y_A$ and $X_B \leq X_A$; $X_B < X_A$ and $Y_B \geq Y_A$; $Y_B > Y_A$ and $X_B \geq X_A$ is verified.

4. A contour follower according to claim 2, wherein the said further gating means have an output, inputs connected to the respective outputs of the comparator means and further inputs adapted to receive manual control signals for the validation of the said output of the further gating means at one of the said four times, in the absence of signals on the outputs of the comparator means, the first and second summing circuits having each a third input and first and second sources of adjustable voltage being respectively connected to the third outputs of the first and second summing circuits for initial positioning of the reading head.

5. A contour follower according to claim 3, wherein each of first and second storage means comprise an analog-to-digital converter having an input connected to the output of the respective summing circuit, said analog-to-digital converter having an output, a digital-to-analog converter having an input, means connecting the output of the analog-to-digital converter to the input of the digital-to-analog converter, the digital-to-analog converter having an output connected to the second input of the respective summing circuit, the analog-to-digital converters each having a further output on which end-of-conversion signals are produced, the said control means including a first AND-gate having two inputs respectively connected to the further outputs of the respective analog-to-digital converters and an output, means connecting the output of the first AND-gate to the respective switching means for opening said switching means, a second AND-gate having an output, a first input connected to the output of the further gating means, a second input connected to the output of the first AND-gate and a third input, said recorder means having an output in which said status signal is produced, the third input of the second AND-gate being connected to said output of the recorder means and means connecting the output of the second AND-gate to the respective switching means for closing said switching means.

6. A contour follower according to claim 5, wherein each of analog-to-digital converter has a further input adapted for receiving start-of-conversion signals, an OR gate having an output connected to the said further inputs of the analog-to-digital converters, said OR-gate having first and second inputs, a clock generator connected to the first input of the OR-gate, the second input of the OR-gate being connected to the reading head for receiving the coincidence pulses.

7. A contour follower according to claim 6, wherein the means connecting each analog-to-digital converter to the corresponding digital-to-analog converter include a memory unit having an input connected to the output of the analog-to-digital converter, an output connected to the input of the digital-to-analog converter, and a further input adapted to receive transfer control signals, a delay element connecting the further output of each analog-to-digital converters to the further input of the respective memory unit.

8. A contour follower according to claim 7, wherein each comparator means includes a digital comparator having first and second inputs respectively connected to the input and to the output of the respective memory unit, and a further memory unit connected to said digital comparator, said further memory unit having the said three outputs and a control input, a further delay element connecting the further output of each analog-to-digital converter to the control input of each further memory unit.

* * * * *